(12) United States Patent
Pieronek

(10) Patent No.: US 7,554,560 B2
(45) Date of Patent: Jun. 30, 2009

(54) SYSTEM FOR DEFINING NETWORK BEHAVIORS WITHIN APPLICATION PROGRAMS

(76) Inventor: Donald Pieronek, 2275 Derrin La., Brookfield, WI (US) 53020

( * ) Notice: Subject to any disclaimer, the term of this patent is extended or adjusted under 35 U.S.C. 154(b) by 386 days.

(21) Appl. No.: 11/317,718

(22) Filed: Dec. 23, 2005

(65) Prior Publication Data

US 2006/0200770 A1 Sep. 7, 2006

Related U.S. Application Data

(60) Provisional application No. 60/638,939, filed on Dec. 24, 2004, provisional application No. 60/638,690, filed on Dec. 24, 2004, provisional application No. 60/638,684, filed on Dec. 24, 2004.

(51) Int. Cl.
G06F 15/16 (2006.01)
G06F 3/048 (2006.01)
G06F 9/54 (2006.01)
H04N 29/08 (2006.01)
H04N 29/06 (2006.01)
H04L 12/28 (2006.01)

(52) U.S. Cl. .................. 345/619; 715/700; 715/733; 715/735; 715/763; 709/201; 709/206; 709/219; 717/120; 717/171

(58) Field of Classification Search .......... 715/733, 715/200, 700, 734–735, 762–765, 835–837; 709/201, 223, 217–220, 250, 206–207; 700/1, 700/90, 19; 712/14, 247; 370/253–254; 717/120, 101, 105, 121, 126–127, 168, 171–178, 717/153; 345/619, 633; 379/270, 279
See application file for complete search history.

(56) References Cited

U.S. PATENT DOCUMENTS

| 5,452,201 | A | 9/1995 | Pieronek et al. |
| 5,453,933 | A * | 9/1995 | Wright et al. ............... 700/181 |
| 6,052,729 | A | 4/2000 | Robinson |
| 6,195,591 | B1 | 2/2001 | Nixon et al. |
| 6,424,872 | B1 | 7/2002 | Glanzer et al. |
| 6,510,352 | B1 | 1/2003 | Badavas et al. |
| 6,745,087 | B2 | 6/2004 | Shah |
| 7,085,841 | B2 | 8/2006 | Edwards et al. |

(Continued)

OTHER PUBLICATIONS

Torsten Heverhagen, Robert Hirschfeld, Rudolf Tracht; "Function Blocks—Introduction"; www.functionblocks.org; Germany, 2003.

(Continued)

*Primary Examiner*—Wesner Sajous
(74) *Attorney, Agent, or Firm*—Boyle Fredrickson, S.C.

(57) ABSTRACT

A graphical interface for programming network communications messages and messaging behavior on a control apparatus that is coupled to a communications network and that is operating under control of an application program. The interface comprises an integrated schematic view of symbols representing communications and including application and messaging control logic including a diagrammatic representation for a network message having icons representing data within said message, icons representing control functions for regulating networking behavior, and one or more messaging connector icons representing interconnections with the network. Control logic icons and symbols may be interconnected may connected to the data and control icons for use in setting data content and regulating messaging and network behavior. Corresponding methods for programming network messages and associated messaging_behavior between control devices are also covered.

7 Claims, 9 Drawing Sheets

U.S. PATENT DOCUMENTS

| | | | |
|---|---|---|---|
| 7,092,771 B2 | 8/2006 | Retlich et al. | |
| 7,114,155 B2 | 9/2006 | Stripf et al. | |
| 7,117,049 B2 | 10/2006 | Horn et al. | |
| 7,130,704 B2 | 10/2006 | McKelvey et al. | |
| 7,225,249 B1* | 5/2007 | Barry et al. | 709/227 |
| 2002/0171763 A1* | 11/2002 | Stecyk et al. | 348/552 |
| 2004/0169654 A1* | 9/2004 | Walker et al. | 345/440 |
| 2006/0007933 A1* | 1/2006 | Maxson et al. | 370/392 |
| 2006/0155389 A1* | 7/2006 | Pessolano et al. | 700/12 |
| 2007/0011321 A1* | 1/2007 | Huntington et al. | 709/224 |
| 2007/0179641 A1* | 8/2007 | Lucas et al. | 700/83 |
| 2008/0263169 A1* | 10/2008 | Brabec et al. | 709/206 |

OTHER PUBLICATIONS

David Kruglinski, George Shepherd, Scot Wingo; Programming Microsoft Visual C++, Fifth Edition; Microsoft Press, Redmond, WA, USA; 1998; pp. 569-583, (Chapter 24).

Bran Selic, Garth Gullekson, Paul Ward; "Real-Time Object-Oriented Modeling"; John Wiley & Sons; 1994; USA; pp. 46-86.

"Unified Modeling Language: Superstructure", version 2.0, Aug. 2005; OMG—Object Management Group, Needham, MA USA; www.omg.org.

Torsten Heverhagen; "A Profile For Integrating Function Blocks Into The Unified Modeling Langauge"; SVERTS Workshop, San Francisco 2003; www.functionblocks.org.

* cited by examiner

SYSTEM FOR DEFINING NETWORK BEHAVIORS WITHIN APPLICATION PROGRAMS

This patent application claims the benefit of Provisional Patent Application Ser. No. 60/638,939 filed Dec. 24, 2004, Provisional Patent Application Ser. No. 60/638,690 filed Dec. 24, 2004 and Provisional Patent Application Ser. No. 60/638,684 filed Dec. 24, 2004 all filed with the United States Patent and Trademark Office.

TECHNICAL FIELD

The field of the present invention is digital network communications and more particularly the development network behaviors and programming of network messaging functions in control devices.

BACKGROUND OF THE INVENTION

Communication networks are used to convey data between devices. The device sending the message has a network address and the device receiving the message has a network address. The specific protocol varies with the network, but all networks utilize some form of message delivery based upon a source address and a destination address to determine where the messages are delivered. The content of the messages and the events which trigger their transmission are generally hidden deep within device software and are not conveniently visible or easily managed by the user. Development of network behaviors, composition of messages and control of message transmission are handled as separate tasks independent of the application programs for control devices. The actions taken upon receipt of a message, or detection of a network error, are either transparent or selected from a limited list of possible behaviors. When devices make the content of a message accessible to the application program it is accessed from intermediate sources such as a type of data table. Accordingly, the development of network messages and behaviors by a user within control devices has involved difficult, inflexible, time consuming and error prone processes.

SUMMARY

This invention defines a method of configuring the operation of network interfaces that from within application programs in control and other devices. The application is developed and edited using a graphical programming tool having an integrated display featuring software, hardware and communications components. The programming tool uses schematically depicted programmable messaging blocks such as production and corresponding consumption objects to represent the networking interfaces for the production and consumption of messages including individual packet message components. These blocks are often integrated with software and hardware of the device for which the program is being developed. Message production and message consumption behaviors are set within the application program and programmed directly in conjunction with the messaging objects through any available configuration communications port. For example a message production object interface might contain a send trigger to initiate message transmission, functions for setting message data, functions for setting network dependent parameters such as address and then monitoring the transmission status from within the application program. This invention defines an object interface that indicates the produced or consumed message status, and functions to set and access message contents, and functions to alter the current state of the producer or consumer object where all information is graphically readily visible to the user via the application program.

Accordingly the present invention involves a method of programming network messaging between devices under control of and as an integrated part of the actual software application programs within the devices. Software, messaging and even hardware features and functions are diagrammatically displayed on an integrated programming tool displays for the control devices. Messaging protocols are diagrammatically displayed with application programs and messaging interfaces are provided as parts of the same integrated display. Communications features are diagrammatically displayed and visible on the integrated display including block diagrams having inputs and outputs corresponding to network protocols. Interconnections may then be diagrammatically made between the software control features and communications features to form messages and perform network messaging functions and determine the network behavior directly within control device application programs. It is an object of the invention that when information is to be transferred over a communications network, the information to be conveyed, the software sending the data, and the software object receiving the data should be clearly conveyed to the user.

It is an object of the invention that when information is to be transferred over a communications network, the events which trigger the transmission of the message and the events which occur upon reception of the message should be clearly conveyed to the user.

It is an object of the invention that when information is to be transferred over a communications network, the information making up the message and the events which trigger the transmission of the message and regulate its receipt should be readily programmable from within the application programs for control apparatus.

It is an object of the invention that when information is to be transferred over a communications network, that the technology for composing messages and controlling their transmission and receipt should be visible, simple and convenient for the user.

DETAILED DESCRIPTION

Figure 1:
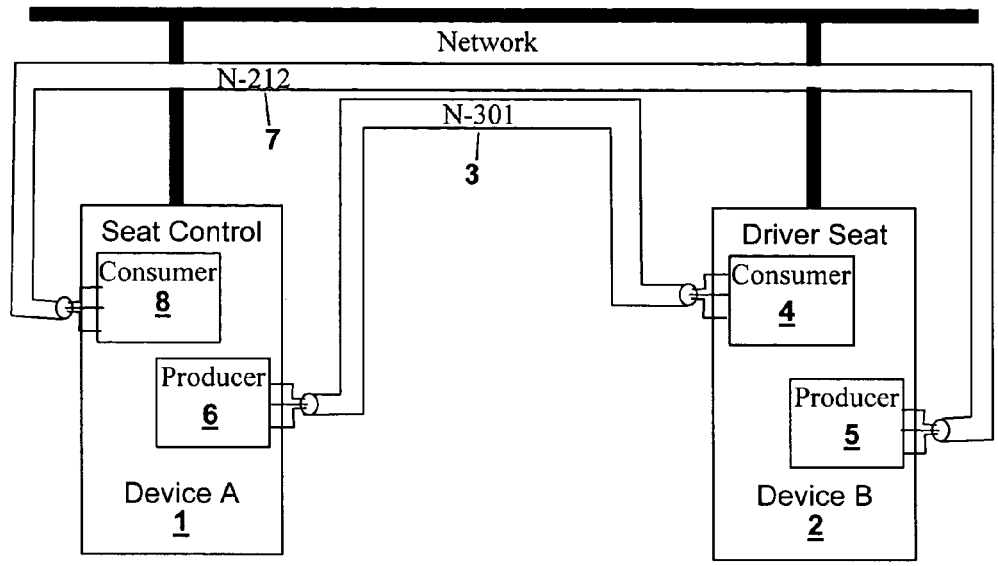
FIG. 1 is a diagrammatic view of the interconnection of two seat position control devices over a network showing cables representing the source and destinations of the messages in accordance with the present invention.

As shown in FIG. 1, the Producer Object (6) in Device A (1) sends a network message over a messaging connector N-301 (3) to the Consumer Object (4) in Device B (2). The Producer Object (5) in Device B (2) sends the network message over a messaging connector N-212 (7) to the Consumer Object (8) in Devices A (1). Utilizing this source Device A (1) to destination Device B (2) view of communication messaging utilizing user visible cables, one form of a messaging connector, that represent individual messages associated with network communication links adds clarity to the user application program.

Figure 2:
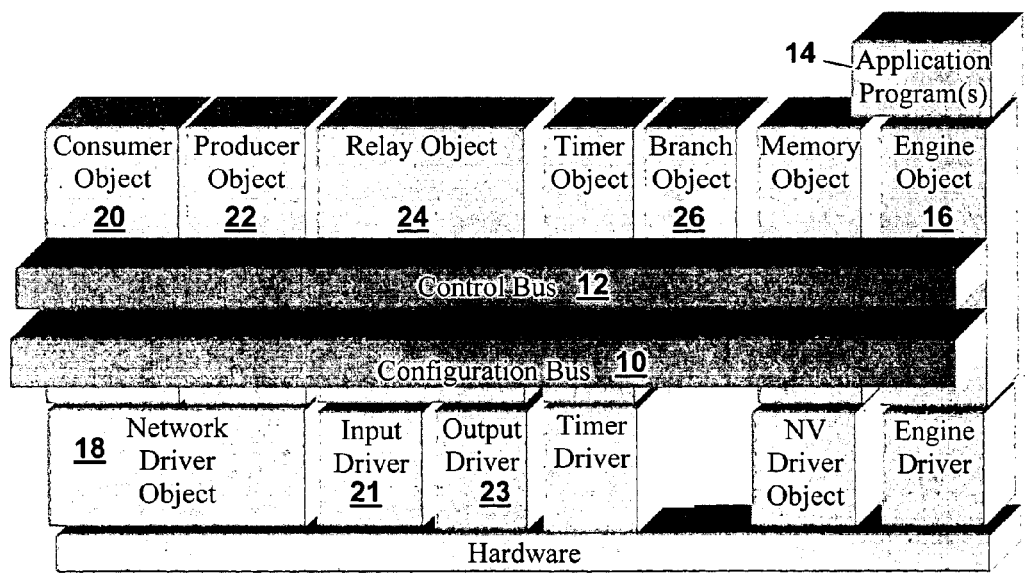
FIG. 2 is a diagrammatic view of the software object architecture model of a device in accordance with the present invention.

In order to enable this functionality the invention contemplates a control system architecture comprised of stand alone devices, devices interconnected with wires, devices interconnected via parallel cables and backplanes, devices interconnected via various serial communications, all of which may be monitored, configured, and programmed using a common schematic view utilizing historical schematic design tool paradigms. As shown in FIG. 2, each architecture compliant Control Apparatus contains an Application Program (14) associated with and Engine Object (16), a set of software control objects providing different types of generic functionality for the device, a common set of interfaces to the user Application Program (14) that interact over an internal Control Bus (12), and optionally provides a common interface to configuration tools over a Configuration Bus (10), where the external configuration interface is independent of the hardware used to execute the Application Programs (14). The Application Program (14) is executed by an application Engine Object (16) resident on the Control Apparatus. The control system is programmed by generating a schematic on a programming terminal of a Tool Device graphically depicting connections, terminals and symbols (for example icons) of objects that may represent physical components or software components within a Control Apparatus. Graphic symbols may also be associated with fixed or programmable components within a Control Apparatus. This schematic is analyzed to determine the type of interfaces to each of the symbols and generates the proper instructions to provide the desired behavior. Portions of the same object may be placed anywhere within the schematic diagram. A design tool may optionally indicate that portions of the same object are used elsewhere within the schematic. The granularity of the interfaces and the application programming paradigm allows the separation of information transfer between symbols, the events which trigger the transfer of information, the status of the transfer of the information, and the execution order of the objects.

As further shown in FIG. 2 the Network Driver Object (18) interfaces with the Consumer Object (20), the Producer Object (22). The Producer Object (22) and Consumer Object (20) both interact with the Control Bus (12) and the Configuration Bus (10). The Configuration Bus (10) routes configuration and monitoring messages from any external network and converts the external interpreted communication protocols of various networks to an internal object specific format. The internal Application Program (14), that defines the operation of the Control Apparatus, is a property of the Engine Object (16) and is accessed for configuration purposes via a Configuration Bus. The Internal Application Program (14) triggers the Software Object functions and the interaction of internal objects over the Control Bus (12) which provides for Control Apparatus application functionality.

The Application Program (14) sets the default (as shipped) behavior of a Control Apparatus as well as being optionally altered to modify the Application Program (14) behaviors within an apparatus utilizing a common set of external interfaces. The object architecture defines methods to translate a common external Application Program format into an internal Application Program (14) format for execution within any Control Apparatus, optionally containing different microprocessors, and converting from an internal Application Program format to a external Application Program format, both of which are delivered over the network dependent Configuration Bus (10).

Figure 3:
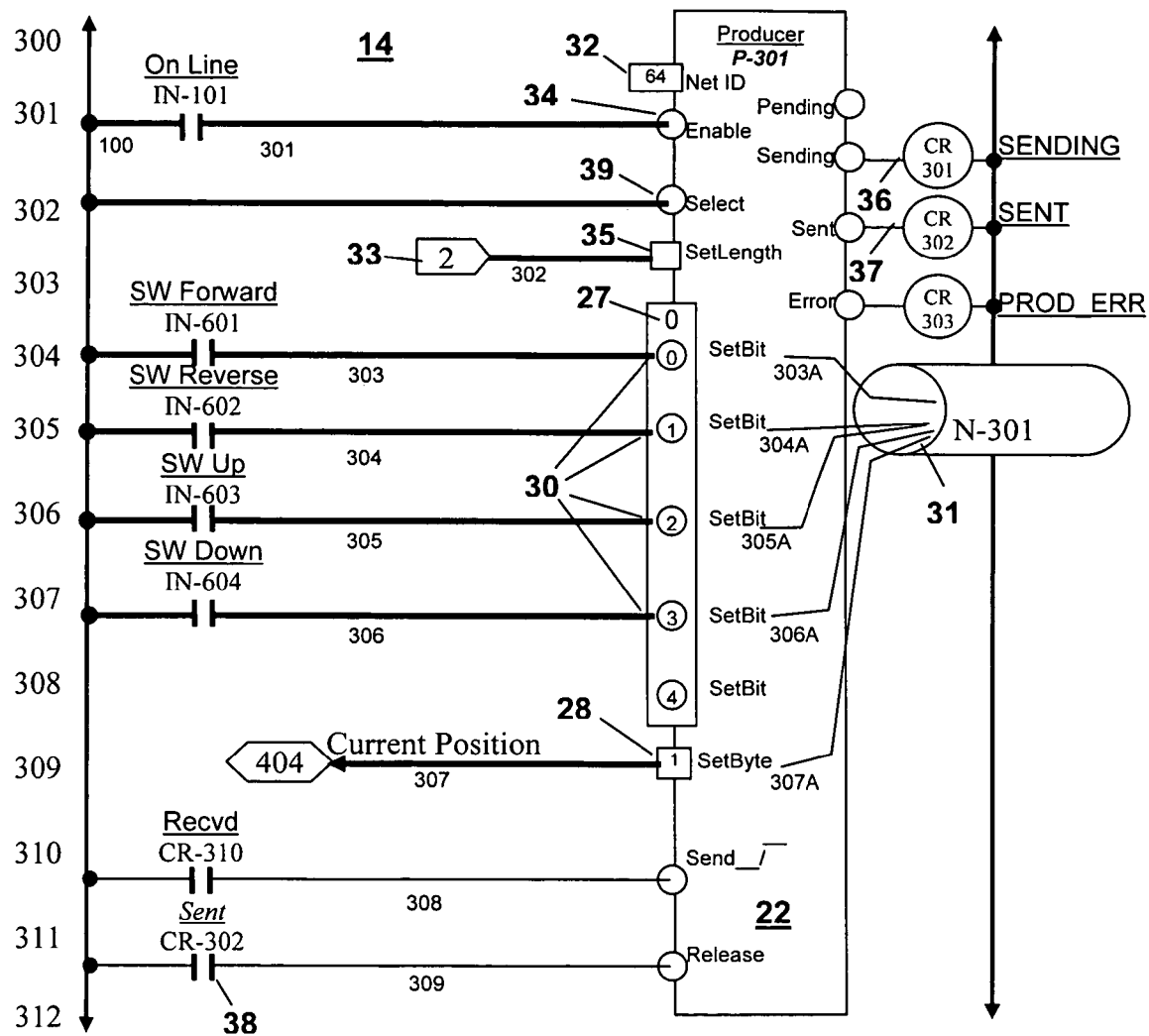
FIG. 3 is a graphical schematic view of the producer object and related functions within a seat position control application program in accordance with the present invention.

When the user zooms from FIG. 1 into a detailed view of the internal communication objects within a Control Device A (1), a view similar to FIG. 3 is provided on the display screen of the Tool Device. The utilization of the Producer Object (22) and associated device independent Application Program (14) provides a network independent Application. As will be discussed, the portion of the Application Program (14) shown in FIG. 3 executes over the real time Control Bus (12) shown in FIG. 2. In FIG. 3 the Producer Object (22) in combination with visible components of the Application Program (14) show the sources of the message data to be sent at SetBit (30) and SetByte (28) function terminals by the Producer Object over the network. As shown on line 304 of FIG. 3, when the SW Forward contact is closed a TRUE (a value of one) is applied to the Producer SetBit function for byte zero, bit zero. When the SW Forward contact is opened a FALSE (a value of zero) is otherwise applied to this Producer SetBit function. In this Tool Device graphical editor implementation, the data byte number (27) is shown at the top of the data element icon rectangle (0 in this case) and the bit number is contained within the circle (30) for the terminal on the Producer Object (22). As with all other icons in FIG. 3, circle interfaces indicated a boolean (bit) interface to a data element icon and rectangular termination points indicate a non-boolean interface to a data element icon. By altering the numbers within the icons for the message terminals the user may change the message bit assigned to the specific data variables. On line 309 of FIG. 3, the hexagon indicates a data value called "Current Position" whose object source is located on line 404 of the Application Program (14), where the Application Program (14) performs a Producer SetByte (28) function on byte one of the produced message data. It should be noted that the "Current Position" source on line 404 shows a corresponding hexagon where the data value set with the value 307 shown inside the hexagon, where line 404 is not currently visible on the display screen. Again, the value one inside of the data element icon rectangle designates the byte offset (28) within the message data being produced where the connected variable is placed within the message packet. The schematic diagram iconic programming architecture allows the user to enable the display of the name of an object property value, such as Current Position, to be associated with virtual schematic wires. This invention does not treat message data uniquely from any other data within the Control Apparatus nor does it hide the presence of network messages from the user, rather it conveys messages as extensions to the wiring within the schematic and as connections that provide the values of the message data and literally convey individual variables in a messages as "individual wires in a cable" that represent different variables within message packets and may convey multiple network messages over a network as multiple cables in a conduit. Utilizing this schematic approach data flowing between various Control Apparatus may be composed of both actual physical wires in conduits as well as virtual wires related to packet structure in conduits. In the message (31) leaving the Control Apparatus is generally indicated by the communications message packet "messaging connector" icon (also labeled as cable N-301) comprising a length of casing of a cylindrical cable wrapped around the wires and extending toward one side of the view representing the message packet parts or bits in FIG. 3 which is the same as the cable (N-301) icon (3) previously shown in FIG. 1, which contains individual virtual wires for the network message. In the preferred implementation one variation that exists between actual physical wires which carry current and the virtual wires in a message cable is reflected in the wire labels, in this case the network wire numbers shown in FIG. 3 that use slightly different labels (303A, 304A, 305A, 306A and 307A) than the wire numbers feeding the message data (303, 304, 304, 306 and 307). Where a real physical wire conveys a voltage level almost instantaneously relative to time, a network data variable's value may be delayed in time in accordance with the control logic of the Application Program (14) that controls the messaging. Using a physical configuration shown in FIG. 1 a variable value may reflect one value at the Control Apparatus feeding the message data (Device A) but have a different value at the network data variable in the Control Apparatus receiving the variable (Device B) at different points in time between transmissions, where they are the same value at the instant the message is sent and received, and where the value in the Control Apparatus feeding the message data (Device A) may then change, which may then vary in Device A and Device B until the point in time when transmission takes place again. This invention recognizes the possible difference in value versus time for network data variables and optionally utilizes different labels on the virtual variable wires. In the preferred implementation, when displaying the network wire values in the network view such as FIG. 3 on a Tool Device display screen, the wire numbers 303A, 304A, 305A, 306A, and 307A would show the last value sent and the current values for wire numbers 303, 304, 305, 306, and 307 making the user aware of any current differences in these variable values between the two Control Apparatus.

When utilizing this architectures' user interface paradigm, when objects have their properties set directly from the network using the Configuration Bus, their current value may be displayed to the user inside the respective rectangular interface as is shown in the Net ID icon (32) in FIG. 3. When the value for an objects' property is set directly from within the Application Program (14) its value or a symbol representing its value (33) is shown on line 303 of FIG. 3 where the value of two shown in the icon is supplied to the respective termination point, Set Length (35). The consequence of either method of setting the value of a property of an object is different and may be determined by the user. When the Application Program utilizes the approach where the value is set directly within a property of the object itself, as indicated by the Net ID value (32) of sixty four in FIG. 3, the value is only stored in internal memory within the Control Apparatus in an area utilized by the object class to save its property values, in this case the Net ID property of the Producer Object (22) class. When the Application Program (14) utilizes the approach where the value is set by a real time Control Bus (12) function of the Engine Object (16) as indicated by the value of two (33) on line 303 of FIG. 3, the value of two is stored in internal memory within the Application Program (38) property of the Engine Object (16) class whose operation will be described shortly. If all property values were set utilizing the Engine Object (16) set value (33) approach, the entire configuration of a Control Apparatus could be archived (backed up) by storing the contents of a single property of a single object class; the Application Program (14) property of the Engine Object (16) class versus some configuration values being contained in the Application Program property and others being contained with various instances of various object classes where the setting the value inside the object class was used. This invention enables these storage decisions to be made by the user. When a traditional approached is used, where property values are set directly within the available software object classes within a Control Apparatus, like the value of sixty four set of the Net ID property (32), the current values of all properties of all classes stored in memory must also be archived to back up the complete configuration of a Control Apparatus. This invention utilizes different graphical representations to convey the method used to set or save property values within a Control Apparatus, where the method shown determines the network dialogs generated by the Tool Device.

The Application Program (14) for FIG. 3, within internal memory for one implementation of a Control Apparatus, is shown in Table 1;

TABLE 1

| Element | Internal Function Identifier | Function Value |
| --- | --- | --- |
| [0] | BRANCH_GET | 0 |
| [1] | RELAY_NO_EXECUTE | ON_LINE |
| [2] | PRODUCER_ENABLE | P-301 |
| [3] | BRANCH_GET | 0 |
| [4] | PRODUCER_SELECTINSTANCE | P-301 |
| [5] | ENGINE_SETEXCHANGE | 2 |
| [6] | PRODUCER_SETLENGTH | P-301 |
| [7] | BRANCH_GET | 0 |
| [8] | RELAY_NO_EXECUTE | SW_FORWARD |
| [9] | PRODUCER_SET_MSG_BIT0 | 0 |
| [10] | BRANCH_GET | 0 |
| [11] | RELAY_NO_EXECUTE | SW_REVERSE |
| [12] | PRODUCER_SET_MSG_BIT1 | 0 |
| [13] | BRANCH_GET | 0 |
| [14] | RELAY_NO_EXECUTE | SW_UP, |
| [15] | PRODUCER_SET_MSG_BIT2 | 0 |
| [16] | BRANCH_GET | 0 |
| [17] | RELAY_NO_EXECUTE | SW_DOWN |
| [18] | PRODUCER_SET_MSG_BIT3 | 0 |
| [19] | COUNTER_GET_OUTPUT | CURRENT_POSITION |
| [20] | PRODUCER_SET_MSG_BYTE | 1 |
| [21] | BRANCH_GET | 0 |
| [22] | RELAY_NO_EXECUTE | RECVD |
| [23] | PRODUCER_SEND | P-301 |
| [24] | BRANCH_GET | 0 |
| [25] | RELAY_NO_EXECUTE | SENT |
| [26] | PRODUCER_RELEASE | P-301 |

In the preferred implementation, the most efficient implementation within a Control Apparatus relative to Application Program (14) memory utilization allocates two bytes per instruction, where one byte is the internal Function Identifier and the second byte identifies the Function Value. In Table 1 the Function Value is the object instance for all internal Function Identifiers with the exception of the Producer SetMsgBit, SetMsgByte and SetExchange Function Identifiers. In the Application Program (14) implementation graphically shown in FIG. 3, and where the internal contents of the Application Program of the Engine Object are shown in Table 1 the internal Function Identifier is the first byte, in this case for the first element is the "BRANCH_GET". The Function Value is the second item of each Application Program (14) property element, like the "0" for instance zero following the "BRANCH_ GET" on the first line of Table 1. The list of instruction byte pairs (Function Identifier and Function Value) are contained within the Application Program (14) property of the Engine Object (16) within a Control Apparatus.

Although the prior Application Program (14) is contained within two bytes per instruction internal to the Control Apparatus, it is converted to, and converted from this implementation dependent internal format within the Control Apparatus to and from an implementation independent format external to the Control Apparatus. The actual execution of the prior Application Program (14) based on this compact two byte per instruction format occurs internal to the Control Apparatus over the Control Bus (12).

In this memory optimized implementation, the Application Program (14) is interpreted by an ENGINE_Execute function within the Engine Object (16) during normal operation. All information is passed between contiguous object functions in the Application Program (14) via shared global memory locations called the Control Bus (12). In this implementation the Control Bus (12) variables are called GLOBAL_Instance and GLOBAL_App. Under normal operation the ENGINE_Execute function reads the Function Value for the first instruction and places its value in GLOBAL_Instance. The ENGINE_Execute function then reads the Function Identifier value, and uses its value to determine the Control Bus Object based function address to be called internal to the Control Apparatus and then executes that function. Using the internal Function Identifier to invoke the actual object function is usually accomplished via a traditional software jump table. The object function which is executed reads then Function Value to be operated upon from the GLOBAL_Instance variable of the Control Bus (12), and for most functions, gets its input value from the GLOBAL_App variable of the Control Bus (12) and places the result of the functions operations into GLOBAL_App and then returns to the ENGINE_Execute function. The ENGINE_Execute function then increments to the next instruction pair in the Application Program (14) and copies the next Function Value into GLOBAL_Instance. It then reads the internal Function Identifier, and as stated previously, the ENGINE_Execute function then uses the internal Function Identifier value in a jump table to go to the appropriate object function within the Control Apparatus. The function called over the Control Bus (12) again uses the value contained in GLOBAL_App as its input value, which was placed there by the previously executed real time Control Bus (12) Object function, and the Function Value from the Application Program (14) contained in GLOBAL_Instance, is used to execute the new function, which again places its result in GLOBAL_App, and again returns to ENGINE_Execute. The prior operations continue, in sequence, time and again until all the encountered instructions are executed and an End Of Program Function Identifier is encountered, at which time execution of the CPU is returned to the object function that called the ENGINE_Execute function, usually from the "main" program function. Some implementations may also cease execution of the Application Program (14) when an invalid Function Identifier is encountered, where the Control Apparatus generally indicates the error and takes an appropriate fault action. In the preferred implementation, the content of the Application Program (14) is verified when new instructions are added to the Application Program (14) property of the Engine Object (16), checked upon a power cycle where the Application Program (14) will not be executed if invalid internal Function Identifiers or invalid Function Values are detected. In the preferred implementation, the content of the Application Program (14) is continuously monitored, and if an entry becomes invalid during operation, fault actions are also taken. This invention encompasses the use of an Application Program (14) to create communications messages, to determine the current state of the communication messages, to manage the operation and fault actions of the communications interfaces all utilizing a visible network independent interface and an implementation independent Application Program (14) interface.

The PRODUCER_Enable function (34) in FIG. 3 updates the state of the Producer Object (22) status coils (36 and 37) each time the PRODUCER Enable (34) function is called. Placing a FALSE on the PRODUCER_Enable (34) input resets the Producer object (22), placing it in its initial, non-operational state. In the preferred implementation the PRODUCER_Pending, PRODUCER_Sending, PRODUCER_Sent and PRODUCER_Error Relay Objects are integrated into the Producer Object (22), as indicated in the schematic diagram by the lack of a wire number between the Producer Object (22) and the respective coils (36 and 37). It should also be noted that in FIG. 3 the PRODUCER_Pending termination point does not show an attached Relay Object since in this specific implementation this coil was not implemented. This invention does not require that an object implement all its defined functions or interfaces and thus the schematic diagram icon may not show the interface when not required or supported by a specific Control Apparatus. A possible implementation of the PRODUCER_Enable (34) function for a single instance of the Producer Object (22) is indicated below in Table 2;

TABLE 2

```
void PRODUCER_Enable(void) {
    if (GLOBAL_App.exchange) {
        switch (GLOBAL_Instance) {
        case USER_1:
            switch (PRODUCER_State[USER_1])
            {
            case NON_EXISTENT:
                RELAY_CoilValue[SENDING] = FALSE;
                RELAY_CoilValue[SENT] = FALSE;
                RELAY_CoilValue[PROD_ERROR] = FALSE;
                X = PRODUCER_msgLength[USER_1];
                While(X)
                    { PRODUCER_MsgData_USER1[X] = 0x00;
                      X = X-1;}
                PRODUCER_State[USER_1] = IDLE;
                break;
            case IDLE:
                RELAY_CoilValue[SENDING] = FALSE;
                RELAY_CoilValue[SENT] = FALSE;
                break;
```

TABLE 2-continued

```
                case SENT:
                    RELAY_CoilValue[SENDING] = FALSE;
                    RELAY_CoilValue[SENT] = TRUE;
                    break;
                default:
                    break; }
                break; /* USER_1 */
            default:
                break;}
            }
    Else {
        switch (GLOBAL_Instance) {
        case USER_1:
            RELAY_CoilValue[SENDING] = FALSE;
            RELAY_CoilValue[SENT] = FALSE;
            RELAY_CoilValue[PROD_ERROR] = FALSE;
            X = PRODUCER_msgLength[USER_1];
            While(X)
                { PRODUCER_MsgData_USER1[X] = 0x00;
                  X = X-1; }
            PRODUCER_State[USER_1] = NON_EXISTENT;
            break;
        default:
            break; }
        }
}
```

As stated previously and shown with respect to FIG. 2, other Producer Object (22) functions as well as the Network Driver Object (18) functions may change the state of an instance of the Producer Object (22) but the status Relay Object (24) coils shown in FIG. 3 (36 and 37) are updated in the Producer Enable (34) function to maintain synchronization within the Application Program (14).

Multiple instances of the Producer Object (22) may reside within a Control Apparatus including the SetBit, SetByte, SetWord and other message writing functions that set data values in multiple messages. To set values in the proper message it is necessary to either specify the Function Identifier, Function Value and byte offset in the respective Application Program (14) function or set a pointer to the desired message data buffer prior to writing to the message buffer. To improve performance, minimize code space and maintain a symmetrical Application Program format the preferred implementation utilizes a PRODUCER_Select (39) function in FIG. 3 to perform this operation, for which some sample code is shown in Table 3.

TABLE 3

```
void PRODUCER_Select (void) {
    switch (GLOBAL_Instance) {
    case USER_1:
        offsetPtr = &PRODUCER_MsgData_USER1[0];
        break;
    case USER_2:
        offsetPtr = &PRODUCER_MsgData_USER2[0];
        break;
    default:
        break;}
    }
```

A Programming Tool Device determines if the PRODUCER_Select (39) function is required within the Application Program (14) by determining if the Producer Object (22) Select (39) external Function Identifier is supported by the Producer Object (22) class within the Control Apparatus via traditional interpreted message dialogs over the Configuration Bus (10).

The PRODUCER_SetLength function (35 in FIG. 3) sets the size of the message buffer for the Producer Object (22) instance specified. Since the SW_Forward contact on line 303 in FIG. 3 is closed, as indicated by the wide line, a TRUE is passed to the PRODUCER_SetBit_0 Function Identifier, setting bit zero of the first byte in the PRODUCER_MsgData_USER 1 [0] byte, as indicated in Table 4 below;

TABLE 4

```
void SetBit_0(void) {
    if (GLOBAL_App.exchange == FALSE)
        offsetPtr[GLOBAL_instance] =
        offsetPtr[GLOBAL_instance] & 0b11111110;
    else
        offsetPtr[GLOBAL_instance] =
        offsetPtr[instance] | 0b00000001; }
```

The PRODUCER_SetByte function is similar to PRODUCER_SetBit Function Identifiers as are the other message data writing functions. If the Producer Object (22) is in the PROD_IDLE state and the PRODUCER_Send function is called passing it a TRUE in GLOBAL_App, the data in the producer's message buffer will be moved to the transmit buffer hardware by the Network Driver Object (18) shown in FIG. 2 and the message is then sent over the network. Once a message begins transmission the PRODUCER_Sending status relay (36) goes TRUE. Upon successful transmission of the message, the PRODUCER_Sending status relay (36) goes FALSE and the PRODUCER_Sent status relay (37) goes TRUE. The Application Program (38) uses the PRODUCER_Sent status relay (37) to take appropriate support actions internally once the message is sent.

In FIG. 3 a contact of the PRODUCER_Sent (37) status relay is used to apply a TRUE to the PRODUCER_Release function on line 311 of the Producer Object (22), returning it to the PROD_IDLE state and allowing it to transmit another message upon another call to the PRODUCER_Send function with a TRUE in GLOBAL_App.

Figure 4:
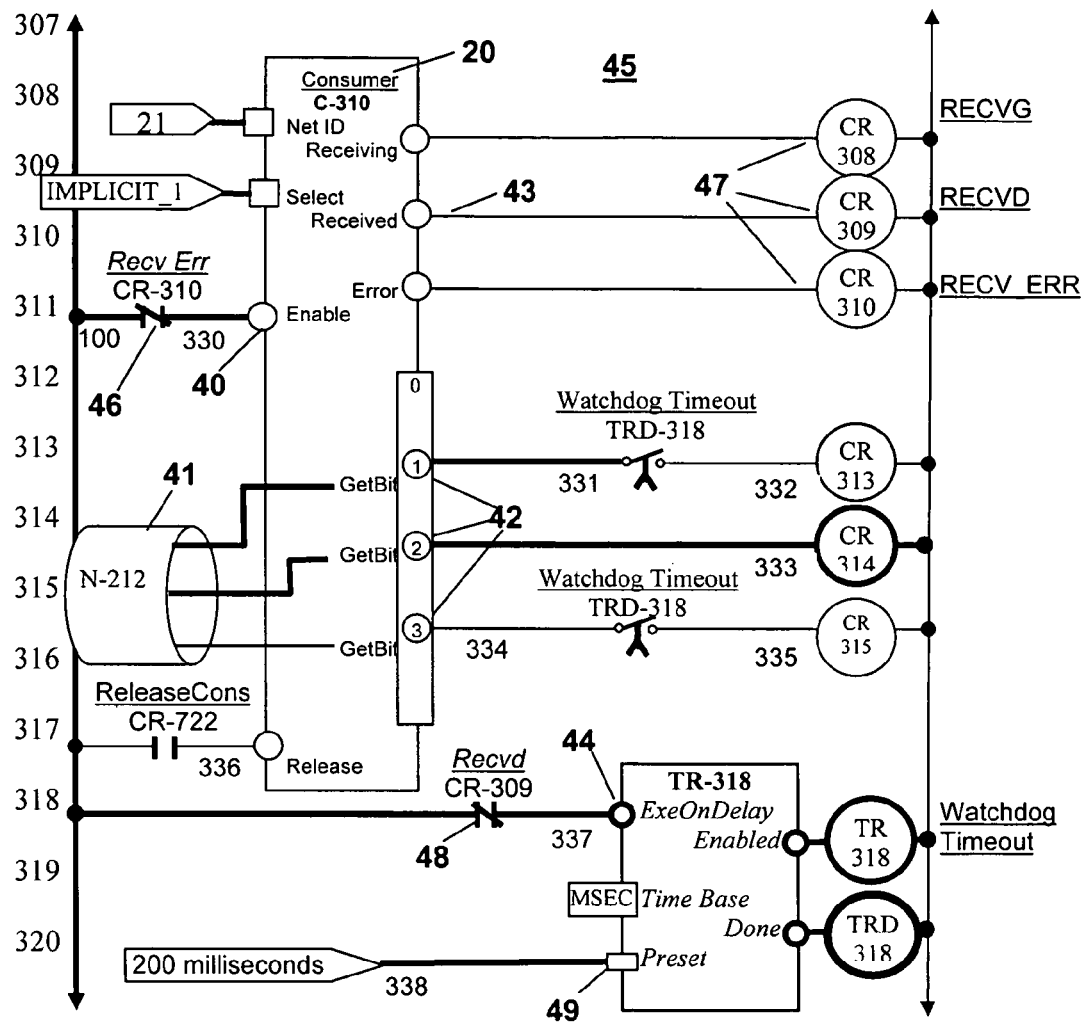
FIG. 4 is a graphical schematic view of the consumer object and related seat position control application program functions in accordance with this invention.

The corresponding receipt of a message is accomplished with a user visible and configurable Consumer Object (20) as shown in FIG. 4. The Application Program (45) shown in FIG. 4 provides a TRUE to the Consumer Objects' (20) CONSUMER_Enable (40) input whenever the left rung, wire 100, is TRUE provided the RecvErr (46) contact is closed. In a manner similar to the Producer Object (22), each termination point of the Consumer Object (20) has an internal Control Bus (12) function associated with its termination points, which are used in an internal Application Program (45), using internal Function Identifiers, to define a Control Apparatus' communications behavior. When a new message is received by the Network Driver Object (18) as generally indicated by the communications message packet messaging connector icon (41), it is placed in a temporary communications message buffer. As shown in the code example in Table 5, when the Application Program (14) is executed and the CONSUMER_Enable (40) function is passed a TRUE the message received into the communications hardware is passed to the data terminals (42) making them accessible to the Application Program (45) and the CONSUMER_Received (43) status relay coil goes TRUE. The wires connected between the CONSUMER_Receiving, CONSUMER_Received (43) and CONSUMER_Error outputs of the Consumer Object (20) and then connected to the respective RECVG coil, RECVD coil and RECV_ERR relay coils (47) are not shown with a wire number since in the preferred implementation the properties of these Relay Object coils are updated directly by functions within the Consumer Object (20) and do not require instructions in the Application Program (45) to read the Consumer Object (20) status termination points and set the respective Relay Object coils. This invention allows objects that are part of a compound object, like the Consumer Object (20) plus three instances of the Relay Object (47), to be treated as a single object class within the Tool Device schematic screen and allows them to be placed at any location within an Application Program (45) display, but in this example their fixed associations (interconnects) are indicated by omitting the wire number designations. The fixed associations (interconnects) of the Consumer Object (20) and three instances of the Relay Object (24) are best exemplified by the code example in Table 5 where this compound object directly sets the RELAY_CoilValue property value of the various Relay Object (47) instances. In the preferred configuration the Tool Device would allow user assignment of the "tag names" associated with these dedicated Relay Object's coils (47). The combination of these two object classes implies a fixed Device Driver Interface.

More specifically, the Relay Object coils connected to the Producer Object (22) status outputs in FIG. 3 and the Consumer Object (20) status outputs in FIG. 4 are actually referenced individually within the Application Program (14) as individual instances of individual Relay Object classes. For the schematic diagram in FIG. 4 the Application Program (45) would reference real time Control Bus (12) Function Identifiers for three individual instances of the Relay Object (47) class and not reference the Consumer Object (20) class.

For the Application Program (45) configuration shown in FIG. 4 when the Consumer Object (20) is enabled and each time a message (41) is received, coil CR-309 is activated and the RECVD normally closed contact (48) of CR-309 on line 318 opens. When a FALSE is passed to the ExeOnDelay (44) termination point of TR-318 it resets the Watchdog Timeout instance of the Timed Delay Relay Object. When the Watchdog Timeout resets, coils TR-318 and TRD-318 go FALSE.

If the ExeOnDelay (44) termination point of TR-318 remains TRUE for a period of time exceeding the value applied to the Preset (49) termination point, or 200 milliseconds in this example, the Done output on TR-318 goes TRUE, activating Timed Relay coil TRD-318. The desired fault actions to be taken when this Watchdog Timeout instance expires are defined by the usage of contacts of TRD-318. In this example, on line numbers 313 and 315 in FIG. 4 normally closed time opening contacts of TRD-318 disconnect the data values from two of the Consumer Object's (20) data (42) termination points from the connected Relay Object coils; CR-313 and coil CR-315. On line number 314 of FIG. 4 Relay Object coil CR-314 remains at its last value (hold last state) since a time opening contact of TRD-318 is not placed between the respective consumed message data bit (42) and CR-314. Since the reading of the data termination points from a Consumer Object's (20) message is performed by visible Function Identifiers within the Application Program (45), fault actions can be understood and any desired fault actions can be created by the end user. The On Delay Timed Relay TR-318 shown in FIG. 4 that is used to determine when a communications fault exists if full view of the user within the Application Program (45) and is not hidden in a communication stack. The fault actions are also made visible as well as the communication timeout preset values, which again are not hidden. Once a message is received by the Network Driver Object (18) and moved to the Consumer Object's (20) data terminals by the CONSUMER_Enable (40) function, the data from the Consumer Object (20) shall remain unchanged until either the CONSUMER_Enable (40) goes FALSE clearing the data termination points as shown in the code example or the CONSUMER_Release function on line 317 of FIG. 4 goes TRUE and another message is received.

TABLE 5

```
void CONSUMER_Enable(void) {
    if (GLOBAL_Logic.exchange) {
        switch (GLOBAL_Instance) {
        case USER_1:
            switch (CONSUMER_State[USER_1]) {
            case NON_EXISTENT:
                CONSUMER_Length[USER_1] = 0x00;
                CONSUMER_State[USER_1] = IDLE;
                RELAY_CoilValue[RECVG] = FALSE;
                RELAY_CoilValue[RECVD] = FALSE;
                RELAY_CoilValue[RECV_ERR] = FALSE;
                break;
            case IDLE:
                RELAY_CoilValue[RECVD] = FALSE;
                break;
            case RECEIVED:
                RELAY_CoilValue[RECVG] = FALSE;
                RELAY_CoilValue[RECVD] = TRUE;
                MoveRecevicedUser1( );
                break;
            default:
                break; }
            break;
        default:
            break; }
        }
    Else {
        switch (GLOBAL_Instance) {
        case USER_1:
            if (CONSUMER_State[USER_1] != NON_EX-
            ISTENT) {
                CONSUMER_Identifier[USER_1].cid16 = 0xFFFF;
                X = CONSUMER_msgLength[USER_1];
                While (X) {
                    CONSUMER_MsgDataConsumed1[0] = 0x00;
                    X = X-1; }
                CONSUMER_State[USER_1]= NON_EXISTENT;
                RELAY_CoilValue[RECVG] = FALSE;
                RELAY_CoilValue[RECVD] = FALSE;
                RELAY_CoilValue[RECV_ERR] = FALSE; }
            break;
        default:
            break; }
    }
}
```

Figure 5:
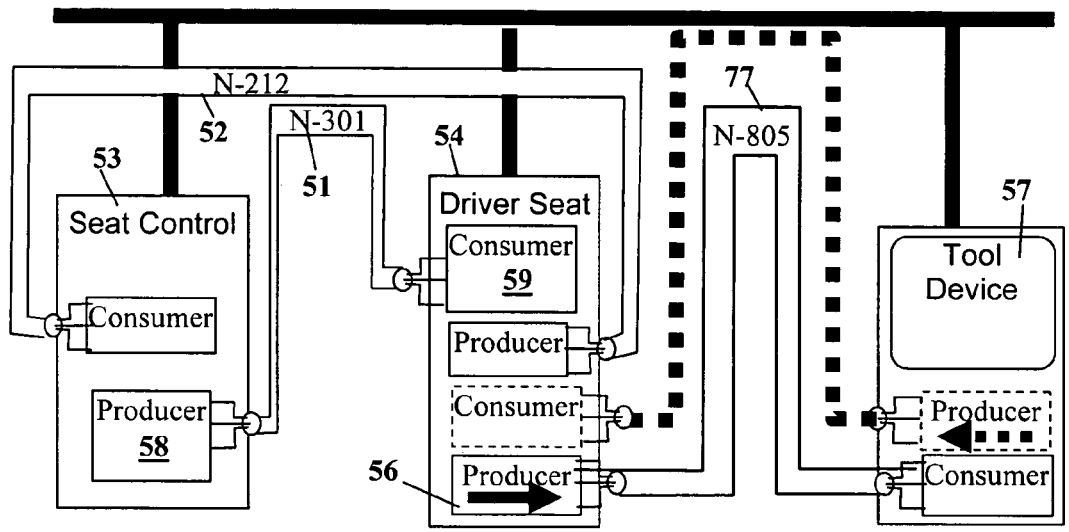
FIG. 5 is a diagrammatic view of the interconnection of three devices including a tool device used to perform real time monitoring of an application program for seat position control in accordance with the present invention.

This invention utilizes Application Programs (14) within Control Apparatus to also create communications interface behavior, including all communication triggering events and communication fault actions, where the desired behavior is based upon the application problem to be solved. This invention also uses Application Programs (14) to create any desired communications interfaces to be used to debug the operation of a Control Apparatus. The following diagnostic example assumes switches, used for moving the drivers' seat in a vehicle, are mounted on the vehicle console, where a network connects the "Forward/Backward" and "Up/Down" controls to two motors located underneath the seat. As shown in FIG. 5, the "Seat Control" device (53) communicates directly with the "Driver Seat" motor device (54) via a network. The Interface to the Producer Object (22) and Consumer Object (20) to the Application Program (14) is independent of the network selected to convey the messages, except perhaps for the Net ID property values and the allowed values for the Length property.

In addition to clearly conveying the network interfaces with an appropriate monitoring and configuration Tool Device (57), this invention provides schematic views of the various electrical devices within a Control Apparatus, like the switches and motors used in this example.

Figure 6:
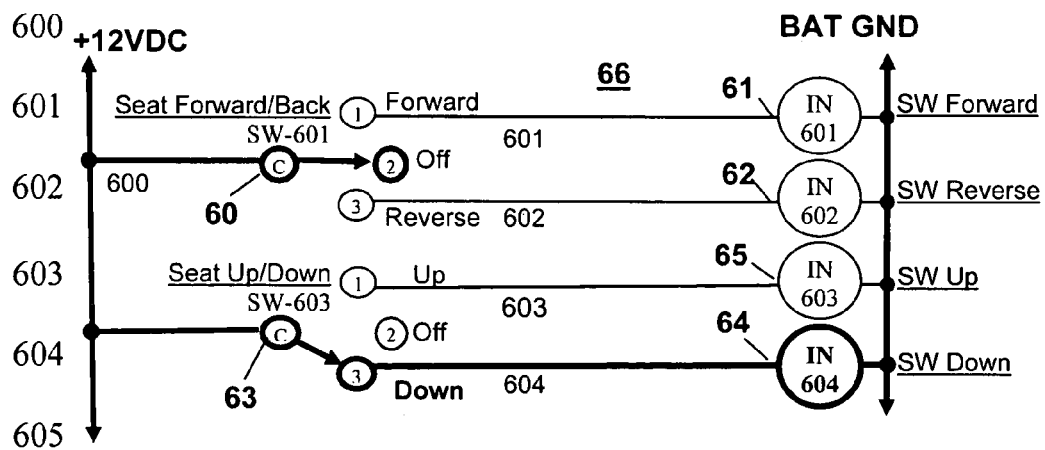
FIG. 6 is a graphical schematic view of a device driver application program showing a combination of physical hardware and its connection to input relays which may be displayed to the user in accordance with this invention.
Figure 7:
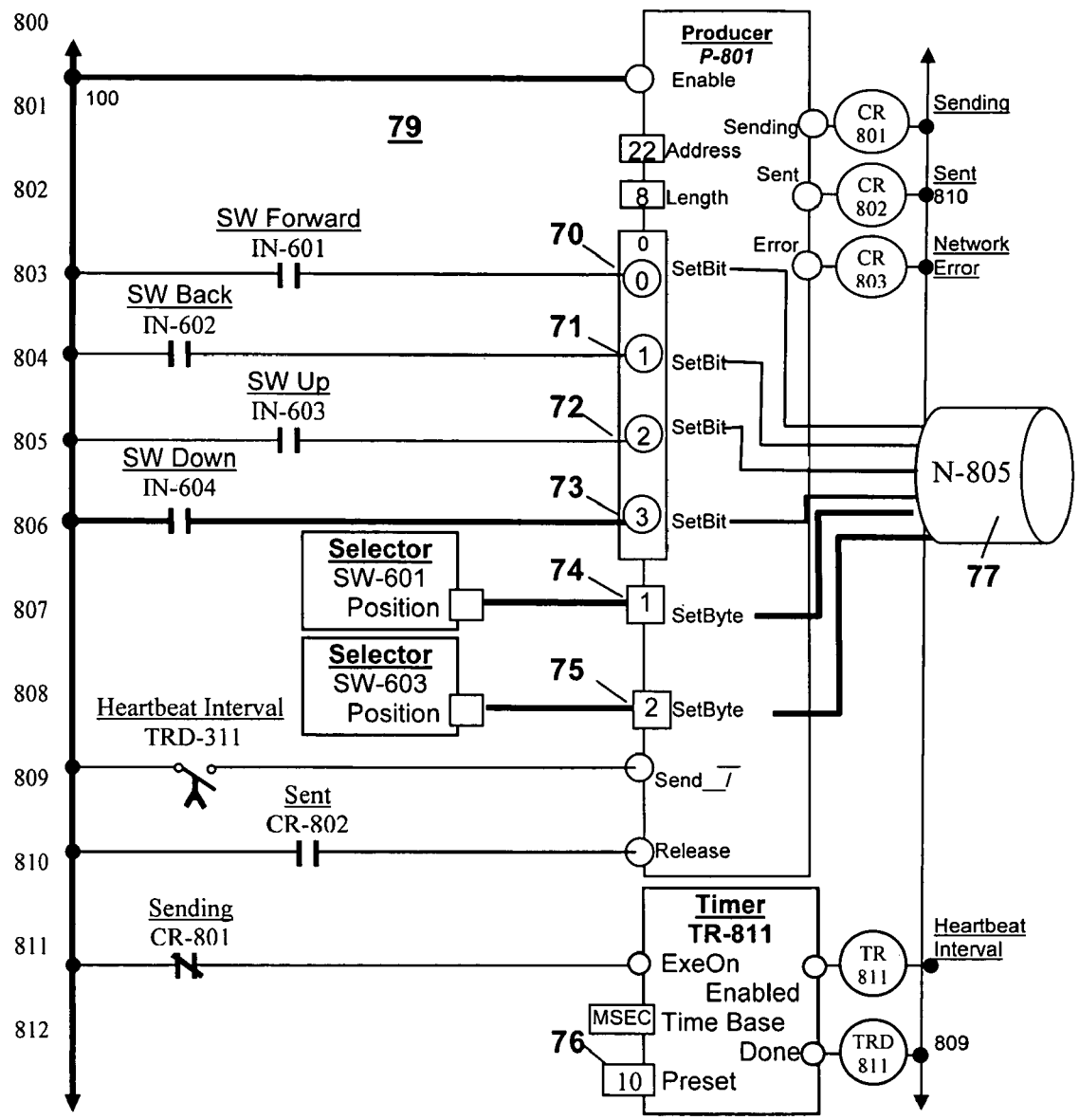
FIG. 7 is a graphical schematic view of a producer object used in conjunction with a debugging application program for use with the seat control application created by a tool device in accordance with this invention.

On line 601 in FIG. 6 the physical switch, SW-601 (60) has its common "C" terminal connected to +12 VDC power, it has terminal 1 "Forward" connected to an input Relay Object IN-601 (61) and terminal 3 "Reverse" is connected to input Relay Object IN-602 (62). When the "Seat Forward/Back" switch (60) is placed in the "Forward" position, the "SW Forward" input Relay IN-601 (61) coil will go TRUE. When the "Seat Forward/Back" switch (60) is placed in the "Reverse" position, the "SW Reverse" input Relay Object IN-602 (62) coil will go TRUE. As indicated by the thick highlighted wires, the "Seat Up/Down" switch SW-603 (63) is being held in the "Down" position, providing power to "SW Down" input Relay Object IN-604 (64), but could provide power to "SW Up" input Relay Object IN-603 (65) if held in the "Up" position. The Application Program (66) reflects the actual physical switches connected to digital hardware input Relay Objects and the schematic display view of FIG. 7 shows the status of the input Relay Object coils (IN-601 on line 803, IN-602 on line 803, IN-603 on line 803, and IN-604 on line 803) which are visible via a Tool Device (57). This invention includes a method of providing the physical view of multiple aspects of a Control Apparatus as shown in FIG. 6, which includes hardware connected to the electronic module (hardware switches 60 and 63) and the internal electronic hardware and associated Device Driver Objects functions and logic that convert these external interfaces to an internal status of the Relay Object coils (61, 62, 64 and 65). As shown in FIG. 2 the Input Driver Object (21) interfaces the input hardware to the Relay Object (24) and the Output Driver Object (23) interfaces the output hardware to the Relay Object (24). Various optimizations are possible, but in the preferred implementation, a Control Apparatus internal Device Driver Application Program (66) for the schematic shown in FIG. 6 would be similar to the internal Application Program included in Table 6.

TABLE 6

| Element | Internal Function Identifier | Function Value |
| --- | --- | --- |
| [0] | PS_GET_TERM_0 | 12VDC |
| [1] | SWITCH_SET_COMMON | SW_601 |
| [2] | SWITCH_GET_T1 | SW_601 |
| [3] | RELAY_SET | IN_601 |
| [4] | SWITCH_GET_T3 | SW_601, |
| [5] | RELAY_SET | IN_602 |
| [6] | PS_GET_TERM_0 | 12VDC |
| [7] | SWITCH_SET_COMMON | SW_603 |
| [8] | SWITCH_GET_T1 | SW_603 |
| [9] | RELAY_SET | IN_603 |
| [10] | SWITCH_GET_T3 | SW_603 |
| [11] | RELAY_SET | IN_604 |

The Application Program (66) provides sufficient information for a Tool Device to interconnect the interface terminals of the objects shown to display the schematic diagram in FIG. 6, but by itself does not provide sufficient information to determine the various properties of all the referenced object instances, primarily the tag names or wire numbers. A Tool Device determines the properties of these objects by performing additional reads of the properties, over the Configuration Bus (10), for the respective instances of the interconnected classes.

Although internal to the Control Apparatus only two bytes are required to represent each termination point of each icon in the Application Program (66) shown in FIG. 6. When this Application Program (66) property of a respective instance of the Engine Object (16) is read from the Control Apparatus, the device independent Application Program (14) shown in Table 7 would be sent by the Control Apparatus over the external network;

TABLE 7

| Element | Class Identifier | Function Identifier | Function Value |
| --- | --- | --- | --- |
| [0] | CID_HDW_POWER | FID_GET | 12VDC |
| [1] | CID_HDW_SWITCH | FID_SET_COMMON | SW_601 |
| [2] | CID_HDW_SWITCH | FID_GET_T1 | SW_601 |
| [3] | CID_RELAY | FID_SET | IN_601 |
| [4] | CID_HDW_SWITCH | FID_GET_T3 | SW_601 |
| [5] | CID_RELAY | FID_SET | IN_602 |
| [6] | CID_HDW_POWER | FID_GET | 12VDC |
| [7] | CID_HDW_SWITCH | FID_SET_COMMON | SW_603 |
| [8] | CID_HDW_SWITCH | FID_GET_T1 | SW_603 |
| [9] | CID_RELAY | FID_SET, | IN_603 |
| [10] | CID_HDW_SWITCH | FID_GET_T3 | SW_603 |
| [11] | CID_RELAY | FID_SET, | IN_604 |

The device independent view returns three unique numbers: one for the Class Identifier, a second for the Function Identifier for the specific class, and a third for the respective Function Value, in this case the instance identifier. Although discussed elsewhere within related architecture invention patent filings, the combination of the externally referenced External Class Identifier and External Function Identifier often results in an internally referenced Internal Function Identifier within the actual memory for the Application Program (14) property of the Engine Object (16). A function within the Engine Object (16), which reads and writes the contents of the Application Program (14) converts Configuration Bus messages containing the common external format to, and from, the internal format for a specific Control Apparatus. Placing this functionality within the Control Apparatus is how this invention accomplishes an implementation independent interface to all Control Apparatus, independent of internal CPU or programming language used to develop the Control Apparatus. Upon retrieving the prior Application Program (14) property of an instance of the Engine Object (16), the requestor Tool Device (57) shown in FIG. 5 would either be aware of the various properties supported by each Class Identifier of a specific Control Apparatus or could make further recursive read requests to the Control Apparatus to determine the properties supported by a specific object class within a specific Control Apparatus. The Control Apparatus architecture invention includes rules on the order in which error responses are returned for a Configuration Bus (10) request allows a requestor device, like to Tool Device (57), to dynamically profile the capabilities of a connected Control Apparatus utilizing a recursive approach. To acquire the information needed to draw the proper Application Program (14) in FIG. 6 the client Tool Device (57) would then read the values of the desired properties of the instances of the classes referenced in the retrieved Application Program (14) listed in Table 7.

For example, the Application Program (14) references the CID_HDW_SWITCH class. The client Tool Device (57) would be aware that the CID_HDW_SWITCH class contains a "subclass" property which identifies the type of switch. The Tool Device (57) could then send a request message similar to the following to the Seat Control (53) Control Apparatus to acquire the value of the "subclass" property;

CID_HDW_SWITCH, GET_PROPERTY, SW_601,
    PROP_SUBCLASS

The Seat Control (53) Control Apparatus would then return the value, of the subclass property, indicating a spring loaded switch. The Tool Device (57) would then send a request message similar to the following to the Seat Control (53) Control Apparatus to retrieve the number of switch positions;

CID_HDW_SWITCH, GET_PROPERTY, SW_601, PROP_POSITIONS

The Seat Control (53) Control Apparatus would then return the switch positions, in this case the value three. The Tool Device would then send a request message similar to the following to the Seat Control (53) Control Apparatus to retrieve the current position of the spring loaded switch;

CID_HDW_SWITCH, GET_PROPERTY, SW_601, PROP_CURRENT_POSITION

The Seat Control (53) Control Apparatus would then return the current switch position, or a value of two. The Tool Device (57) would perform a similar sequence of messages to acquire additional information for SW_603 (63) in FIG. 6. Although utilizing the common in the art request/response communications paradigm for reading individual properties of individual instances of individual classes is allowed and necessary for object properties like the previously referenced "subclass" and "positions" properties, most real time applications also require a more timely view of the state of various objects like retrieving the "current position" value. A Tool Device (57) prefers to obtain object state information with fewer messages then one request message per object state property. This is extremely important for real time monitoring and debugging of Control Apparatus to determine system faults.

To acquire object state information in a timely manner a Tool Device (57) configures an available Producer Object (20) instance within the Seat Control (53) Control Apparatus with an Application Program (79) similar to that shown in a schematic diagram format in FIG. 7.

The Application Program (79) shown in FIG. 7 may be appended to the existing Application Program (14) within a Control Apparatus by the diagnostic Tool Device (57) or may be downloaded to the Application Program (14) property an additional instance of the Engine Object (16) when multiple instances are supported within the Control Apparatus.

For example the status of the "SW Forward" input Relay Object sets bit zero of byte zero (70) in the Producer Object's message data property, the status of the "SW Back" input Relay Object sets bit one of byte zero (71), the status of the "SW Up" input Relay Object sets bit two of byte zero (72), the status of the "SW Down" input Relay Object sets bit three of byte zero (73), the "position" property of the "Seat Forward/Back" Selector Object sets byte one (74), and the "position" property of the "Seat Up/Down" (63) Selector Object sets byte two (75). The duration of time within the Seat Control node required to execute the Application Program (79) in FIG. 7 over the Control Bus (12) is less then the time required to service a single Configuration Bus (10) Request Message to read a single property of a single instance, and now all the desired property values are contained within a single produced message applied to the messaging connector N-805 (77). As shown on line 812 of FIG. 7 the state values shall be produced at the "Preset" (76) property interval of the Heartbeat Interval instance of an On Delay Timer TR-811, or once every ten milliseconds.

As a user scrolls through various portions of the Application Programs (14) within the Control Apparatus, and different real time information is required to highlight the status of the Application Program (14) currently being displayed within the current Tool Device (57) window, message data written to the debug message (77) data property is dynamically changed to remove data no longer needed and object property values are added to include the new information required. Since the Control Apparatus architecture utilizes the same functions used to create Application Programs (14) to perform Control Apparatus debugging and monitoring, a Tool Device (57) may dynamically change the debugging functionality within a target Control Apparatus as it is needed by merely changing the Application Program within the target Control Apparatus.

For example, the ability to monitor the internal Application Program's (14) object states as it is running is not contained in special firmware within the Seat Control (53) device and did not exist until it was added to the Application Program (79), as shown in FIG. 7, by the monitoring Tool Device (57). It should be noted that although the Application Program (79) shown in FIG. 7 was appended to the Primary Application Program (14) this was done by software within the software Tool Device (57) transparent to the user whom is scrolling through the Application Program (14) viewing its current object states. Whether or not this "debugging Application Program" (79) is shown to the user should the user scroll through the location in the Application Program (14) where the respective instructions reside, is dependent upon the software Tool Device (57) being used. This is optional with the Tool Device (57) and may become a user decision, although since Control Apparatus resources (memory and time) are utilized it is recommended they get displayed since they may negatively affect the maximum Application Program (14) size the Control Apparatus can hold. Where Application Program (14) space is needed a user could optionally inhibit the on line monitoring functionality, or limit its size, and regain the associated resources and thereby a user can control how Control Apparatus memory is utilized to support core versus debugging functionality.

Tool Device (57) software may provide internal functionality which identifies the state information already available in the messages already produced on the network by the respective Control Apparatus and only monitor object property values not already conveyed in an existing message. This Tool Device (57) functionality is only useful when all object state information is already available and available within a time interval required by the Tool Device (57). For example, the existing Application Program (14) within the Seat Control (53) may be similar to that shown in FIG. 8.

Figure 8:
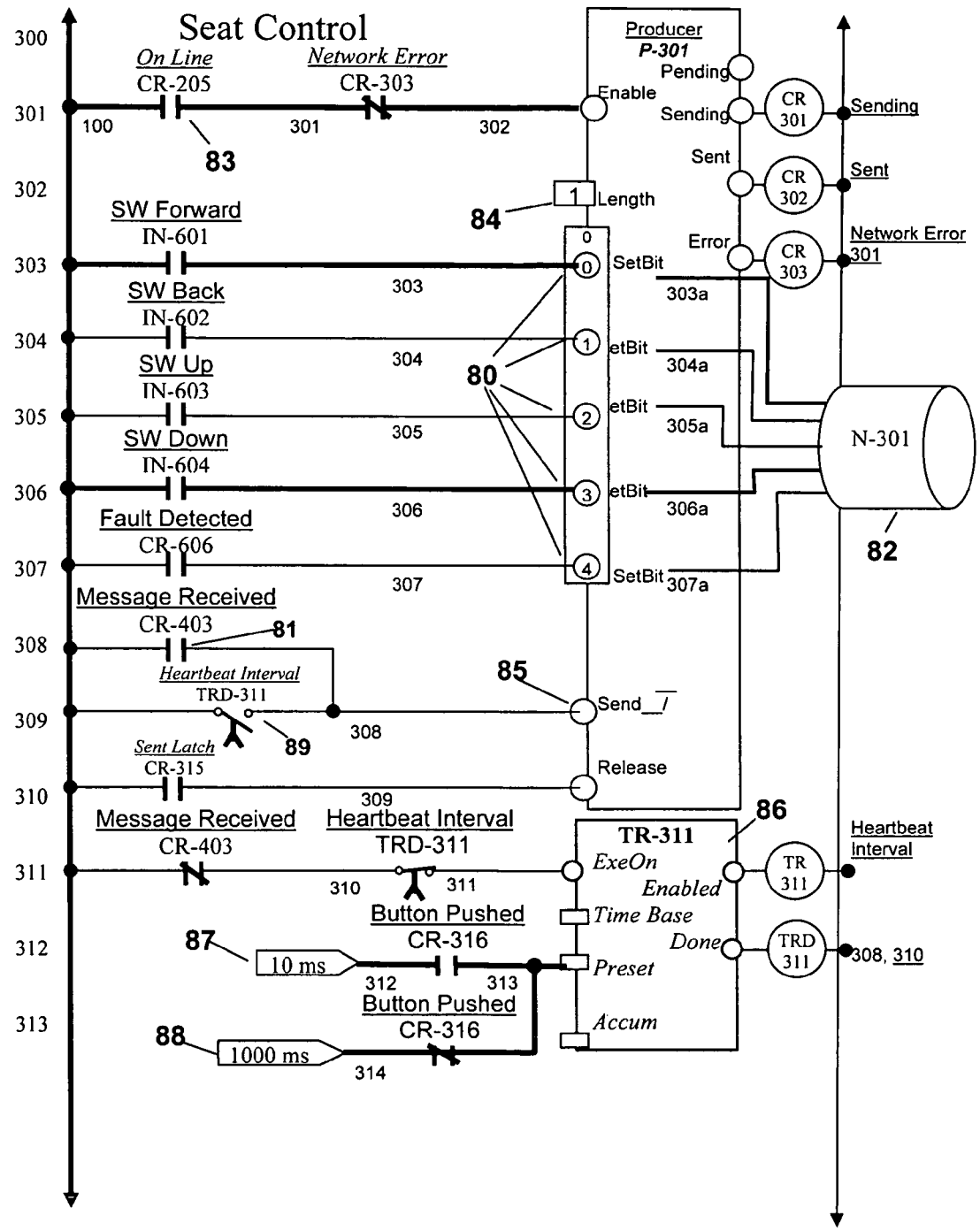
FIG. 8 is a graphical schematic view of a producer object used in conjunction with a seat position control application program executed within a control device to vary the production rate of a message based upon the state of the system in accordance with this invention.

As indicated in FIG. 8, the content of the produced message (82) is constructed by connecting contacts of the desired Relay Objects to bits (80) in the produced message (82). The contents of the message are clearly visible, as well as the source of the information placed in the produced message (80). If highlighting is used then the state of the Boolean values is intuitive. Events which trigger the production of the message are clearly shown in the Application Program (14) like those that set the "Send" (85) function to TRUE (and initiation message transmission). In this case, the On Delay Timed Relay Object (86) that triggers the production of this message on line 309 when the timed closing contact TRD-311 (89) closes is not hidden in a network stack or a cryptic property of some non-intuitive object class, but is clearly visible to the user utilizing familiar icons. When the Application Program (14) contains the timer preset interval (87) and (88) it is clearly indicated utilizing understandable icons. In this case, when the "On Delay Timed Relay Object contact" (89), TRD-311 on line 309 closes or the "Message Received" (81) contact closes on line 308 the message is sent.

This invention makes network interface behaviors visible to the user not only for the purposes of diagnosing network faults, but also to enable the knowledgeable user to modify the network behavior to provide optimal control of the target application, in this case the control of the seat position. Displaying the message triggers, in addition to providing a familiar user interface to monitor and modify these behaviors is an integral part of the architecture.

Figure 9:
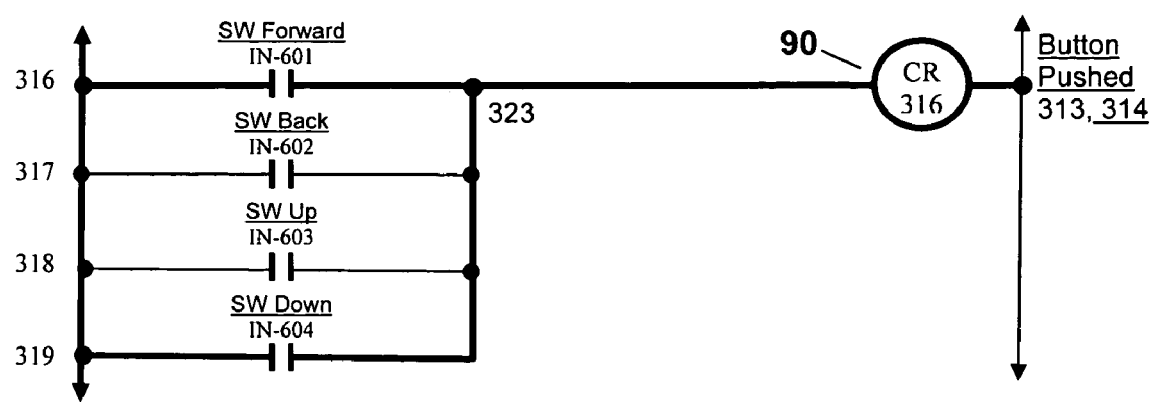
FIG. 9 is a graphical schematic view of a portion of an application program utilized to perform a change of state communications send event associated with the seat control application in accordance with this invention.

The Application Program in FIG. 9 enables information to be exchanged on a shorter timed interval when the seat switches are being pressed, and sent at a slower interval when the seat switches are not pushed, by activating or deactivating Relay coil CR-316 (90) which then modifies the On Delay Timer Relay Object's Preset property value as shown on lines 312 and line 313 of FIG. 8. This invention provides this visibility relative to the internal network behavior of a Control Apparatus within the Application Program (14) as a means of providing flexibility in allowing the user to conveniently provide any desired network behavior.

When any of the switches whose normally open contacts are shown in FIG. 9 are pushed, the associated contact shown on lines 316, 316, 318 and 319 in FIG. 9 will close, thus activating coil CR-316 (90). Whenever CR-316 is TRUE, it closes its open contact on line 312 in FIG. 8 and opens its normally closed contact shown on line 313, applying instead the 1000 millisecond preset value (88) to TR-311 for the On Delay Timer Relay Objects' Preset property applies a value of 10 milliseconds (87) to the present value. Conversely, whenever CR-316 is FALSE, it closes its normally closed contact on line 313 in FIG. 8, connecting the 1000 millisecond preset value (88) to the On Delay Timer Relay Objects' Preset property and opening CR-316 on line 312 removing the 10 millisecond (87) present value. This will result in the message (82) in FIG. 8 being produced on the network at a ten millisecond interval whenever a button is pushed versus the one thousand millisecond interval when none of the seat switches are being pressed. In effect a higher speed message transmission, and therefore loop closure is achieved only when it is needed, when the seat is moving. This behavior conserves network bandwidth for other Control Apparatus traffic when the seat is not being repositioned, while producing the messages at a slow interval sufficient to prevent consuming nodes timing out on the Seat Control (53), and indicating a communications failure. When the Seat Control (53) switches are not depressed, the desired motor status is sent in the N-301 message (82) once every one thousand milliseconds (TR-311).

APPLICATION EXAMPLE

Figure 10:
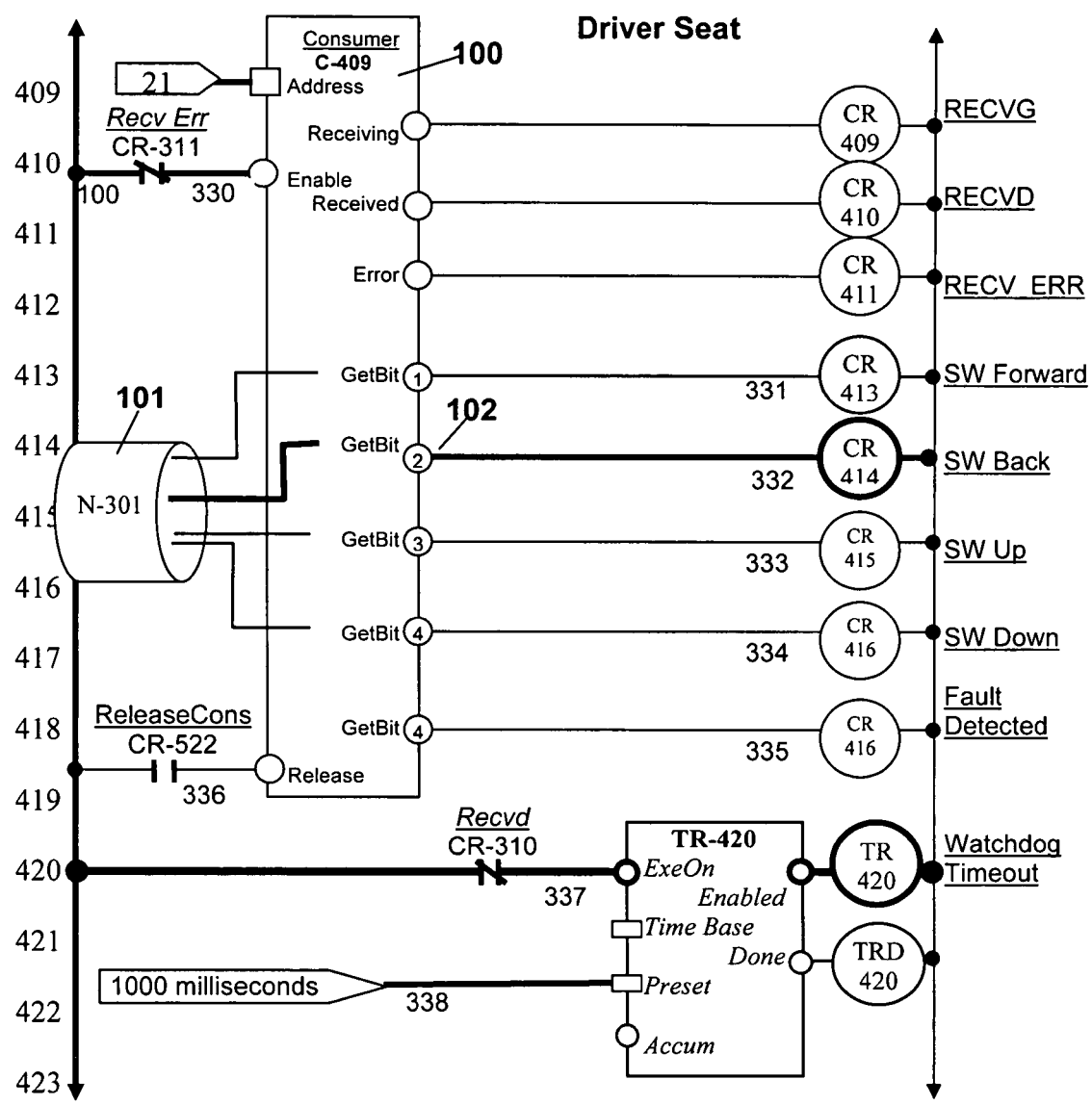
FIG. 10 is a graphical schematic view of a consumer object used in conjunction with a debugging application program related to the seat control application executed within a tool device in accordance with this invention.

Assume the technician pushes the "Seat Forward" switch (60) and the seat does not move. Additionally, as shown in FIG. 10, assume the technician monitors the message consumed (101) N-301 from the Seat Control (53) Control Apparatus within the Driver Seat (54) Control Apparatus and determines the SW Back bit (102) is TRUE and the seat is not moving. Therefore, the fault resides within the Driver Seat (54) Control Apparatus and not the Seat Control (53) Control Apparatus.

Figure 11:
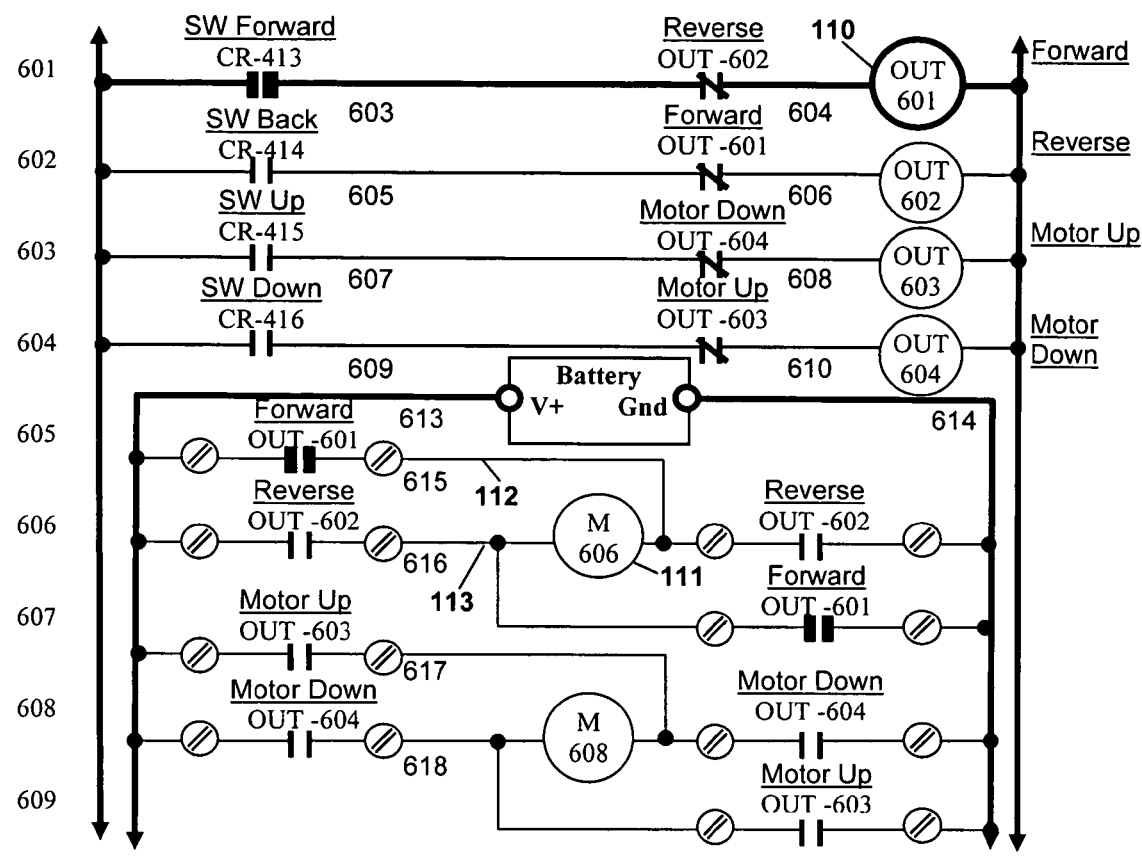
FIG. 11 is a graphical schematic view of a combined executable application program and a device driver application program and associated wiring and hardware related components merged into a single integrated view within a tool device in accordance with this invention.

A technician may wish to determine actual motor states and thus would upload all the Application Programs contained within the Driver Seat (54) shown in FIG. 5. As shown in FIG. 11, the Forward output Relay Object (110) OUT-601 is TRUE (highlighted). The motor M-606 (111) on line 606 is not shown as being ON since wire number 616 (113) into the motor and wire 615 (112) out of the motor are not highlighted. In this specific implementation, this is not possible to diagnose further via the network since the contacts feeding the motor M-606 are electromechanical relays as indicated by the screw terminals into and out of the contacts. At this point the technician would be required to use a voltmeter to check for the presence of twelve volts on wire 615 (112) to determine if the contact is closed. If a twelve volt potential were to be present, the technician would check wire 616 (113) to determine if zero volts is present to check if the motor has failed, the wiring is defective or there may be a defective relay contact going to ground. It should be noted these diagnostics were performed without opening a manual of any type but merely by connecting a Tool Device to the network.

When the Control Apparatus supports programmable Application Programs (14), it is not necessary for a Control Apparatus to contain all desired diagnostic functionality in firmware, since it can be added by the technician while debugging with respect to a specific problem. Due to the intuitive programming and diagnostic environment, this may be accomplished with little programming knowledge. When system diagnostics are performed by less knowledgeable technicians, the software tool may recursively program a series of Application Programs (14) into the Control Apparatus and automatically determine where a fault exists. Minimally a user can "view" the state of the Application Program (14) as these diagnostic Application Programs (14) are executed. For example, to determine if the motor M-606 is operational, the motor may be tested in Reverse. If this is accomplished via product specific software within a test tool, or by the technician utilizing the Application Program (14) schematic shown in FIG. 11 is a tool specific issue.

For example, the Tool Device (57) software could be used to disable the Producer Object (22) within Seat Control (53) Control Apparatus by disabling the "On Line" Relay, thus opening the "On Line" contact (83) on line 301 of FIG. 8 (or by various other means). Once disabled, the software Tool Device (57) could produce the same message otherwise produced by the Seat Control (53) Control Apparatus, prompting the technician to verify the physical operation of the seat. Due to the ability to view and/or modify the operation of a Control Apparatus within the Application Program (14) this architecture enables much better control over the target application as well as providing highly useful diagnostics at the same time without the benefit of additional firmware intended for these purposes.

This architecture includes the ability to dynamically alter the network interface behaviors via a user Application Program (14). The example provided in FIG. 8 was used to provide better control response times, the example in FIG. 10 was used to monitor the internal operation of the Control Apparatus. This architecture defines a network interface object paradigm that enables protocol independence, which allows the user to utilize all the various forms of message triggers and message indications of the selected network while maintaining existing control message structures. This is accomplished utilizing the same user objects as used in all other portions of the user Application Program (14). Stated differently, if the network supports a certain behavior like request/response, change of state, broadcast or any other triggering mechanism, this invention implements these communication behaviors in the user Application Program (14) when they are needed within a Control Apparatus instead of having the behavior buried in the communications stack where it is not visible to the user. When network behaviors and object states are visible and displayed utilizing an industry specific interface in the Tool Device (57) the user can easily identify a network timeout, a change in transmission interval, identify an application error, the state of message data, and so forth and so on.

Although the present invention has been described with reference to the specific embodiments described above, it should be recognized that changes may be made in the form and details of the invention as described without departing from spirit of the invention or the scope of the claims.

The invention claimed is:

1. An industrial controller executing a control program to control equipment or machinery in real-time using a communication network, the industrial controller including a programming terminal and a processor executing a stored program to display a graphical interface for programming network communications messages and messaging behavior on the communications network and operating under control of the control program also programmable by means of the interface, said interface comprising:
   a) a message icon representing a communications message on said network, including:
      i) a plurality of data element icons representing data elements within said message,
      ii) a plurality of messaging control icons representing functions for regulating networking behavior, and
      iii) one or more messaging connector icons;
   b) a plurality of control logic icons connected to said data element and control icons representing software control logic within the control program for setting data content and regulating message and associated network behavior.

2. The graphical interface of claim 1, in which: said message icon comprises a generally rectangular block having said data element and messaging control icons and said one or more related messaging connector icons.

3. The graphical interface of claim 2, further including: a plurality of network status icons connected in between said message icon and a messaging connector icon.

4. The graphical interface of claim 1, in which: said data element icons comprise bit and byte termination points that include bit and byte designation numbers that may be set by the user.

5. The graphical interface of claim 4, in which: said message icon represents functionality for producing a message.

6. The graphical interface of claim 1, in which: said plurality of control logic icons include ladder logic rung and contact icons.

7. The graphical interface of claim 1, in which: said messaging connector icons include an icon formed by diagrammatic depiction of a cable with wires from said data element icons leading to said cable.

* * * * *